United States Patent [19]

Gie

[11] 4,443,965
[45] Apr. 24, 1984

[54] MOSQUITO KILLER

[76] Inventor: Ong T. Gie, Budimulia Jl. Ampera Besar 13A, Pademangan Barat, Jakarta Utara, Indonesia

[21] Appl. No.: 337,948

[22] Filed: Jan. 7, 1982

[51] Int. Cl.³ .................. A01M 1/06; A01M 5/02; B01D 46/28
[52] U.S. Cl. ............................. 43/139; 15/246; 43/140; 416/247R
[58] Field of Search ............................. 43/139–143; 15/246; 416/247; 55/473, 295, 296

[56] References Cited

U.S. PATENT DOCUMENTS

| 886,535 | 5/1908 | McCurdy | 43/140 |
|---|---|---|---|
| 1,292,871 | 1/1919 | Pierce | 43/140 |
| 2,340,944 | 2/1944 | Easter | 43/139 |
| 2,639,780 | 5/1953 | Hardy | 55/296 |
| 2,778,150 | 1/1957 | Pohlman | 43/139 |
| 3,041,773 | 7/1962 | Gagliano | 43/139 |
| 3,755,992 | 9/1973 | Ylinen | 55/296 |
| 4,006,033 | 2/1977 | Schewe | 55/296 |

FOREIGN PATENT DOCUMENTS

| 709224 | 5/1965 | Canada | 55/295 |
|---|---|---|---|
| 618847 | 3/1927 | France | 43/139 |

Primary Examiner—Nicholas P. Godici
Assistant Examiner—Charles L. Willis
Attorney, Agent, or Firm—Hill, Van Santen, Steadman & Simpson

[57] ABSTRACT

An insect killer having a housing containing a motorized suction fan for drawing insects into the housing and securing them to a screen member covering a rear opening of the housing, and a scraping bar mounted on a rotating shaft in sliding contact with the interior side of the member which will crush the insects when rotated.

5 Claims, 9 Drawing Figures

U.S. Patent   Apr. 24, 1984   4,443,965
FIG. 1
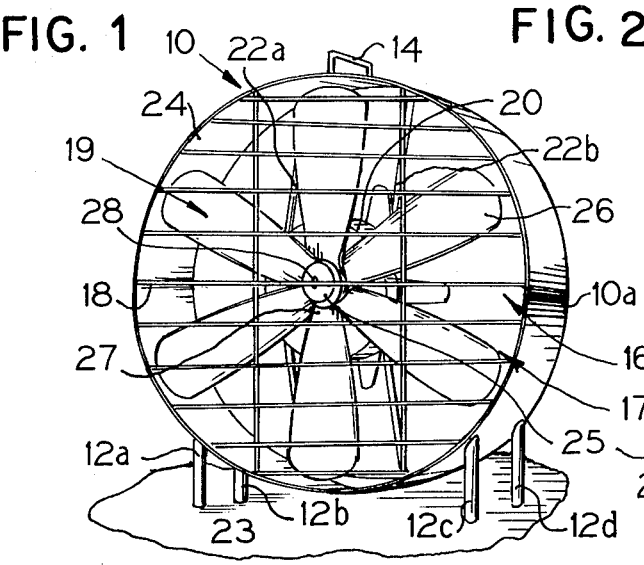
FIG. 2
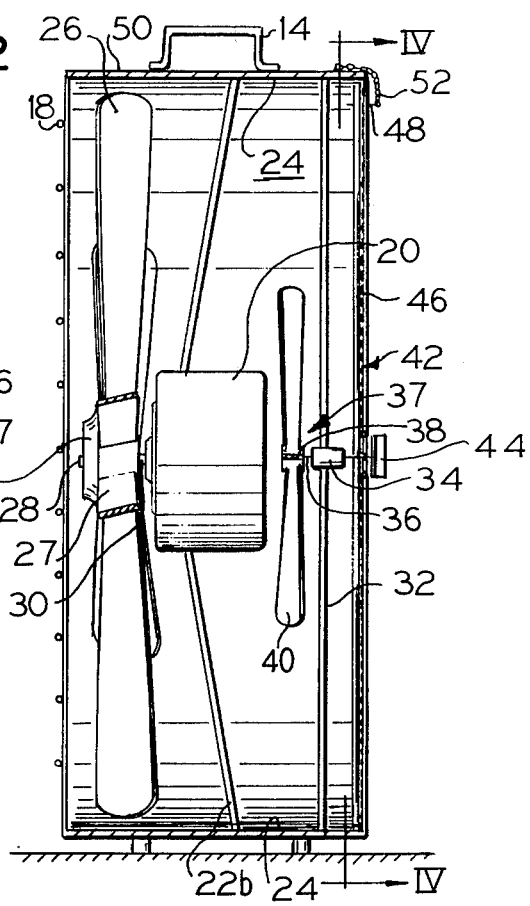
FIG. 3
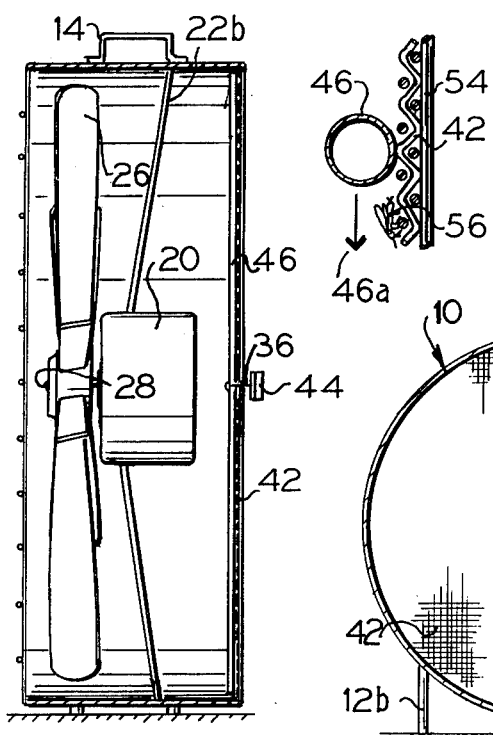
FIG. 6
FIG. 4
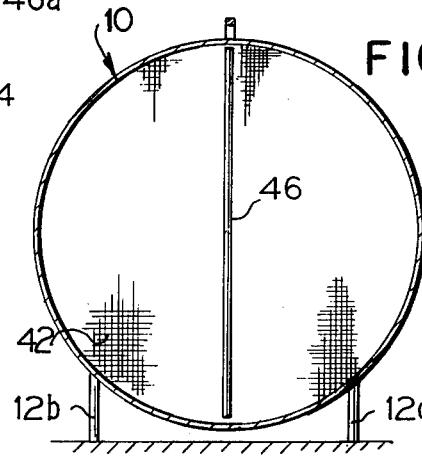
FIG. 5
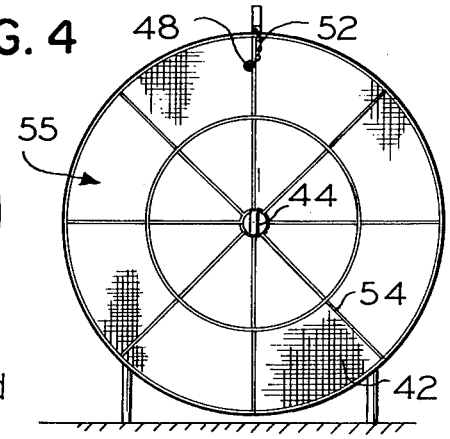
FIG. 7
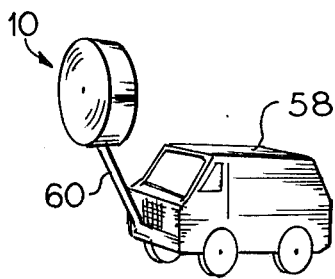
FIG. 8
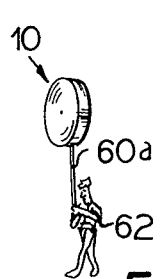
FIG. 9
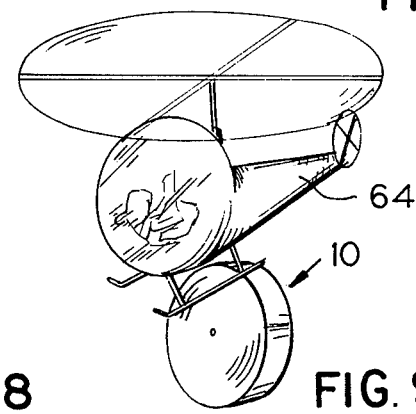

MOSQUITO KILLER

BACKGROUND OF THE INVENTION

1. Field of the Invention

The invention relates to a means for capturing and destroying large numbers of mosquitos by means of a suction fan.

2. Prior Art

Heretofore, the only method available to kill mosquitos or other insects on a large scale was by means of chemical insecticides, which were usually applied by arial spraying. Such spraying can have short and long term debilitating effects both on the human population and on the environment. Chemical insecticides dispersed in such a fashion have remained and contaminated both the land and the water supplies over which they have been used.

On a smaller scale, effectively reducing the insect populations which inhabit the gardens and backyards of domestic households has involved either the use of chemical sprays or devices which employ small electric currents to kill the insects. Such electrical devices have two major disadvantages in that they require relatively large operating currents to maintain power sufficient to provide an adequate current for killing various insects, and that they kill insects in a very local area. Additionally, such devices may also harm unintended victims such as small children who may be attracted to the glow of the filament through which the current flows.

SUMMARY OF THE INVENTION

This invention is a suction fan device which can be varied in size so as to be suitable for use both in household backyards and gardens as well as in large insect breeding areas. The insect killer is comprised of a housing inside of which is positioned a motor which is used to rotate a plurality of large fan blades. A screen or gauze material is stretched across the rear side of the housing so as to prevent the insects from escaping from the interior portion of the housing. A bar is positioned within the housing and adjacent the interior side of the screening material. A smaller fan which rotates by means of and simultaneously with the rotational motion of the larger fan blades is attached to the bar and causes the bar to rotate against the interior face of the screening material, crushing any insects which may have been trapped on the screen material. The smaller fan rotates intermittently as desired and when not rotating, is held in place by means of a pin.

Large scale models of the insect killer may be mounted to vehicles and helicopters so as to enable the potential users such as governmental bodies to kill large numbers of insects over wide areas without the harmful effects of chemical spraying. In addition, portable models which are large enough and yet light enough to enable a single individual to carry such devices may be employed in countries which lack sufficient capital to afford the purchase of insect killers mountd to motorized vehicles or helicopters, but which have an abundance of labor available to use this device in a size capable of being carried by an individual person.

My inventive method includes the steps of:
operating a motorized fan so as to cause air to flow through a hollow housing and through a screen or other mesh member affixed to an end of the housing, collecting insects born by the flow of air on an interior surface of the screen or mesh member, sliding a rigid member across the interior surface of the screen or mesh member, thereby destroying insects collected thereon.

My inventive method can also include in the step of sliding, rotating the rigid member about a point which corresponds to the center of rotation of the fan in response to the flow of air through the fan.

BRIEF DESCRIPTION OF THE DRAWINGS

FIG. 1 is a perspective view of an insect killer provided in accordance with this invention;

FIG. 2 is a side view of the insect killer provided in accordance with this invention;

FIG. 3 is a side view of another embodiment of the insect killer provided in accordance with this invention;

FIG. 4 is a cross-sectional view along lines IV—IV of FIG. 2;

FIG. 5 is a rear view of an insect killer provided in accordance with this invention;

FIG. 6 is an enlarged fragmentary view showing additional details of the invention; and FIGS. 7, 8 and 9 show alternate modes of use of the invention.

DESCRIPTION OF THE PREFERRED EMBODIMENTS

While the principles of the present invention find a particular utility in an insect killer, it will be understood that the suction fan arrangement of the present invention may be utilized in other combinations. Not by way of limitation but by way of exemplary disclosure of the best mode of practicing the invention, and by way of enabling one of ordinary skill in the art to practice my invention, various embodiments of my invention are shown in FIGS. 1-9.

There is shown generally in FIG. 1 a cylindrically shaped housing 10 having a plurality of support members 12a, 12b, 12c, 12d projecting generally from the lower portion of the housing 10. A handle member 14 is affixed generally along the top portion of the housing 10 enabling the user to transport the insect killer to the desired location. The housing 10 has a solid cylindrical wall 10a which is impervious to the insects to be killed. A protective grid network 16 comprising a series of generally parallel and perpendicular bars 18 is affixed to the cylindrical housing 10 across a front opening 17. The spacing between the individual bars 18 of the grid network 16 is sufficient to permit the passage of insects through the grid network 16 into the interior portion of the housing 10 while preventing the accidental insertion of other objects into the housing 10.

Positioned within the housing 10 is a suction fan assembly 19 having a motor 20 which is supported by means of a pair of support bars 22a, 22b which are affixed to an interior wall 24 of the housing 10. A hub 25 is mounted to the motor 20 and to which are fixed a plurality of fan blades 26. The motor 20 provides the means whereby the fan blades 26 rotate in a circular motion producing a suction force capable of drawing into the housing 10 flying insects moving across the front opening 17 of the housing 10. A fastening means 28 such as a locking nut is used to secure the hub 25 to the motor 20.

In FIG. 2, the hub 25 is mounted to a support shaft 30 which projects outwardly from the motor 20, enabling the hub 25 and the fan blades 26 to rotate when the motor 20 is emergized. A second support bar 32 is affixed to the interior wall 24 of the housing 10 and is positioned generally directly behind the motor 20. A bearing element 34 is affixed to the second support bar 32 and enables a second support shaft 36 to be mounted in a generally rigid position. A smaller second fan assembly 37 having a second hub 38 to which are affixed a plurality of smaller fan blades 40 is mounted to the second support shaft 36. The second support shaft 36 extends from the second hub 38 through the bearing element 34 rearward through a gauze or screening material 42 and ending in a second handle member 44.

Rotatably mounted to the second shaft 36 and interfacing with the screening material 42 is a killer bar 46. The killer bar 46, which is held in a relatively fixed position by means of a pin 48 which projects through the screening material 42, can rotate when the pin 48 is removed from the screening material 42. The second hub 38, the smaller fan blades 40 and the killer bar 46, rotate simultaneously with the rotational motion of the blades 26 of the fan assembly 19. The rotational motion of the killer bar 46 against the screening material 42 crushes any insects which would be held in place against the screening material 42 by means of the suction effect caused by the larger fan assembly 19. The pin 48 may be attached to an outer wall 50 of the housing 10 by means of a chain 52. The second handle member 44 enables a user to rotate the killer bar 46 manually if too many insects collect on the screening material 42, preventing the rotation of the killer bar 46 by means the second fan assembly 37.

A second embodiment of the present invention is shown in FIG. 3 wherein the smaller fan assembly 37 is eliminated. In the embodiment of FIG. 3 the user is required to rotate the killer bar 46 manually by means of the second handle member 44 in order to crush the insects against the screening material 42. This embodiment is more economical to produce.

FIG. 4 shows the killer bar 46 generally extending the entire length of the diameter of the rear face of the cylindrical housing 10. The mesh member or screening material 42 may be any color while the fan blades 26 are generally a very dark color. This color arrangement has been found to be most effective in attracting insects such as mosquitos to within the area where they may be drawn through the blades 26 of the fan assembly 19 and into the housing.

Insects such as mosquitos will be drawn into the housing 10 by the combination of the color scheme of the screening material 42 and the fan blades 26, and the sound produced by the rotational motion of the fan blades 26 within the housing 10. For household usage, it has been found that the optimal rotational speed of the motor 20 is approximately 1200 r.p.m.'s, while the optimal diameter for the fan blades 26 is approximately 12 inches.

FIG. 5 shows a number of bars 54 extending across a rear opening 55 of the cylindrical housing 10 and affixed to the interior wall 24 of the housing 10. The bars 54 act to prevent the movement of the screening material 42 when the suction fan assembly 19 is engaged.

FIG. 6 is a fragmentary enlarged view which shows the killer bar 46 in sliding contact with the screening material 42. As the killer bar 46 moves in a direction 46a, it crushs any insects 56 which are held against the screening material 42 by means of the effect created the suction fan assembly 19. The bar 54 prevents the screening material 42 from moving to any great degree because of the influence of the force produced by suction fan assembly 19.

FIGS. 7, 8 and 9 illustrate different modes by which the insect killer may be employed. FIG. 7 illustrates the invention as it may be used on a much larger scale as, for instance, by various governmental bodies in removing insects from larger areas. FIG. 7 shows the invention mounted to a motorized vehicle 58 by means of a support member 60. Such an arrangement would enable the user to cover a great deal of territory within a relatively short period of time.

For various regions in which a great deal of man power is available, FIG. 8 illustrates another method by which insects may be removed from a large area. A large number of individual users 62 carrying the invention by means of a support member 60a and walking adjacent to one another would also be able to remove insects from a large area. The embodiments shown in FIGS. 7 and 8 are especially useful against insects such as mosquitos, tze-tze flies, and mediterranean fruit flies.

Still another method of using the invention is shown in FIG. 9 where the invention is affixed to a helicopter 64 which may be mounted in such a manner so as to remove insects from large areas and difficult to reach places. The embodiment shown in FIG. 9 is especially useful in destroying large numbers of locusts.

While the killer bar 46 is shown rotatably mounted therein, it may also be mounted for translatory movement. In such an instance, housing 10 could be formed with an essentially rectangular shape. It will be understood that the flow of air through the hollow housing 10 has a sufficiently high velocity such that insects collected on the interior surface 42a of the screen or mesh member 42 can not fly back out of the housing 10.

Although various modifications may be suggested by those skilled in the art, it should be understood that I wish to embody within the scope of the patent warranted hereon all such modifications as reasonable and properly come within the scope of my contribution to the art.

I claim as my invention:

1. An insect killer comprising:
   a housing;
   a suction fan assembly mounted within said housing;
   a screening material covering a rear opening of said housing;
   a second fan assembly mounted within said housing and positioned between said suction fan assembly and said screening material;
   a killer bar rotatably mounted within said housing and in sliding contact with said screening material; and
   means for mounting said second fan and said killer bar so that the air flow generated from said suction fan comprises the means for driving said second fan, and that said second fan comprises the means for driving said killer bar simultaneously such that the rotation of said killer bar crushes and kills any insects held onto an interior side of said screening material by means of a suction effect produced by said suction fan assembly.

2. The insect killer of claim 1 wherein said means for mounting said second fan and said killer bar comprises a second support shaft extending from said second fan through said screening material.

3. The insect killer of claim 1 in which said second fan assembly is positioned within said housing by means of a second support bar.

4. A method for destroying insects using a motorized fan supported within a hollow housing with a mesh member affixed to an end thereof comprising the steps of:

engaging the motor and rotating the fan thereby creating a flow of air of a selected velocity in a selected direction through the housing and the mesh member, collecting insects born on the air flowing through the housing on a surface of the mesh member interior to the housing, and rotating a rigid member, in response to the flow of air through the housing, about a point essentially corresponding to a center of rotation of the fan, across and in sliding contact with the surface of the mesh member interior to the housing, thereby destroying all insects collected thereon.

5. The method according to claim 4 including the step of:

moving the housing selectively to enhance collection of the insects.

* * * * *